(12) United States Patent
Garcia De Alba Garcin

(10) Patent No.: US 7,940,332 B2
(45) Date of Patent: May 10, 2011

(54) SIGNAL DETECTION DEVICE AND METHODS THEREOF

(75) Inventor: Sergio Garcia De Alba Garcin, Guadalajara (MX)

(73) Assignee: Freescale Semiconductor, Inc., Austin, TX (US)

( * ) Notice: Subject to any disclaimer, the term of this patent is extended or adjusted under 35 U.S.C. 154(b) by 1238 days.

(21) Appl. No.: 11/551,145

(22) Filed: Oct. 19, 2006

(65) Prior Publication Data

US 2008/0094507 A1    Apr. 24, 2008

(51) Int. Cl.
*H04N 5/08* (2006.01)
(52) U.S. Cl. ......................................... 348/532; 348/530
(58) Field of Classification Search ........... 348/525–535
See application file for complete search history.

(56) References Cited

U.S. PATENT DOCUMENTS

| 4,081,833 | A | * | 3/1978 | Akiyama | 348/532 |
| 4,400,733 | A | * | 8/1983 | Yost | 348/533 |
| 5,489,946 | A | | 2/1996 | Kommrusch et al. | |
| 6,154,256 | A | | 11/2000 | Bruins | |

OTHER PUBLICATIONS

Mitsumi, "No-adjustment Sync Separator: Monolithic IC MM1108," Apr. 8, 1992, 5 pages.
INTERSIL, "EL1881: Sync Separator, Low Power," Data Sheet, Oct. 20, 2004, FN7018.1, 11 pages.
INTERSIL, "EL1883; Sync Separator with Horizontal Output," Data Sheet, Jul. 26, 2004, FN7010.1, 9 pages.
National Semiconductor, "LM1881, LM1881-X Video Sync Separator," Jan. 2006, 13 pages.

* cited by examiner

*Primary Examiner* — M. Lee

(57) ABSTRACT

A device for detecting synchronization pulses in a video signal is disclosed. The device includes a transistor. The base-emitter voltage of the transistor is maintained below a threshold level in response to receiving active video information. The base-emitter voltage is increased above the threshold level in response to receiving synchronization information, whereby the transistor is turned on to generate an asserted synchronization signal. Accordingly, in response to active video information being received and the transistor being off, the magnitude of the synchronization signal is set to a first level and in response to synchronization information being received, and the transistor being on, the magnitude is set to a second level. The synchronization signal generated by the transistor is processed to provide both horizontal and vertical synchronization signals.

20 Claims, 3 Drawing Sheets

SIGNAL DETECTION DEVICE AND METHODS THEREOF

FIELD OF THE DISCLOSURE

The present disclosure relates to signal processing and more particularly to signal detection devices and methods.

BACKGROUND

Video signals, such as composite video signals, include synchronization pulses to indicate where a video decoder should place the active video information contained in the video signal. For example, horizontal synchronization pulses synchronize the horizontal placement of the video picture information at the display device, while vertical synchronization pulses synchronize the vertical placement of the picture information. The synchronization pulses are represented by a particular level or magnitude of the video signal relative to the video picture information. For example, in a composite video signal, lower magnitude portions of the signal referred to as synch tips represent the horizontal and video synchronization pulses, where the video signal level is relatively lower than the signal levels representing the active video information.

However, while the relative levels of the synchronization pulses and the active video information are typically known, the absolute levels of the video signal can vary depending on the source of the video signal. Accordingly, the synchronization pulses can be difficult to decode directly using a fixed threshold. In some video decoders this is overcome by clamping the video signal and the threshold level prior to detection of the synchronization pulses. However, the clamping and decoding circuitry can consume an undesirable amount of circuit area.

Accordingly, there is a need for an improved device and method for detecting synchronization pulses in a signal.

DETAILED DESCRIPTION

A device for detecting synchronization pulses in a video signal is disclosed. The device includes a transistor. The base-emitter voltage of the transistor is maintained below a threshold level in response to receiving active video information. The base-emitter voltage is increased above the threshold level in response to receiving synchronization information, whereby the transistor is turned on to generate an asserted synchronization signal. Accordingly, in response to active video information being received and the transistor being off, the magnitude of the synchronization signal is set to a first level and in response to synchronization information being received, and the transistor being on, the magnitude is set to a second level. The synchronization signal generated by the transistor is processed to provide both horizontal and vertical synchronization signals.

Figure 1:
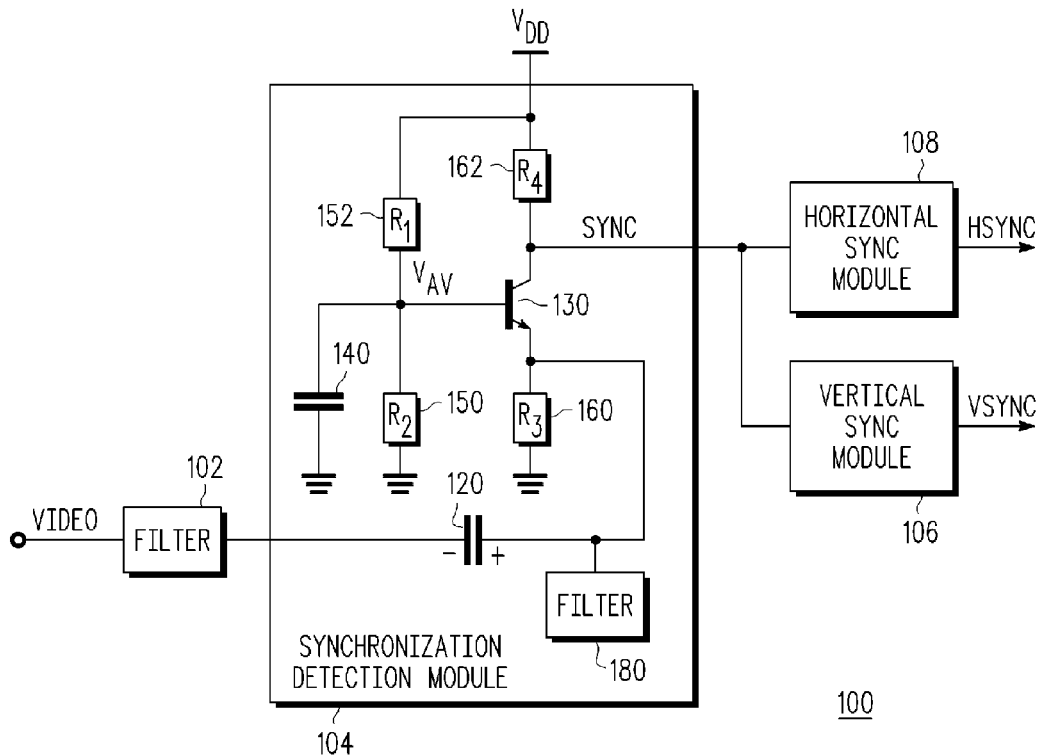
FIG. 1 is a combined block and circuit diagram of a particular embodiment of a device for detecting synchronization pulses in a video signal.

Referring to FIG. 1 a combined block and circuit diagram of a particular embodiment of a device 100 for decoding synchronization signals is illustrated. The device 100 includes a filter 102, a synchronization detection module 104, a vertical sync module 106, and a horizontal sync module 108. The filter 102 includes an input to receive a video signal labeled VIDEO and an output to provide a filtered representation of the signal VIDEO. The synchronization detection module 104 includes an input connected to the output of the filter 102 and an output to provide a synchronization signal labeled SYNC. The horizontal sync module 108 includes an input connected to receive the signal SYNC and an output to provide a horizontal synchronization signal labeled HSYNC, while the vertical sync module includes an input connected to receive the same signal SYNC and an output to provide a vertical synchronization signal labeled VSYNC.

During operation, the filter 102 receives and filters the VIDEO signal. In a particular embodiment the VIDEO signal is a composite video signal and the filter 102 filters outchroma information from the active video portion of the signal VIDEO. The filtered signal is provided to the synchronization detection module 104 which detects synchronization pulses in the filtered VIDEO signal and provides an indication of their occurrence in the SYNC signal. The horizontal synchronization detection module 108 and the vertical synchronization detection module 106 process the SYNC signal to provide the horizontal synchronization signal HSYNC and the vertical synchronization signal VSYNC respectively. The signals HSYNC and VSYNC can be used by a video decoder to locate video information within a video signal for further processing. For example, the HSYNC and VSYNC signals can be used to position the electron beams for a television display, or to locate and decode information sent during the vertical blanking interval, such as closed caption information, program schedule information, and the like.

The synchronization detection module 104 includes an N-channel bipolar transistor 130, resistive elements 150, 152, 160, and 162 (resistive elements 150-162), capacitors 120 and 140, and a filter 180. The resistive elements 150-162 may each be a resistor, an inductor, and the like. The transistor 130 includes a first (collector) current electrode to provide the signal SYNC, a second (emitter) current electrode, and a control (base) electrode. The resistive element 162 includes a first electrode connected to a voltage reference VDD and a second electrode connected to the first current electrode of the transistor 130. The resistive element 152 includes a first electrode connected to the voltage reference VDD and a second electrode connected to the control electrode of the transistor 130. The resistive element 150 includes a first electrode connected to the control electrode of the transistor 130 and a second electrode connected to a ground voltage reference. The resistive element 160 includes a first electrode connected to the second current electrode of the transistor 130 and a second electrode connected to the ground voltage reference.

The capacitor 140 includes a first electrode connected to the control electrode of the transistor 130 and a second electrode connected to the ground voltage reference. The capacitor 120 includes a first electrode to receive the filtered VIDEO signal from the filter 102 and a second electrode connected to the second current electrode of the transistor 130. The filter 180 includes a first electrode connected to the second current electrode of the transistor 130 and a second electrode connected to the ground reference voltage.

Figure 2:
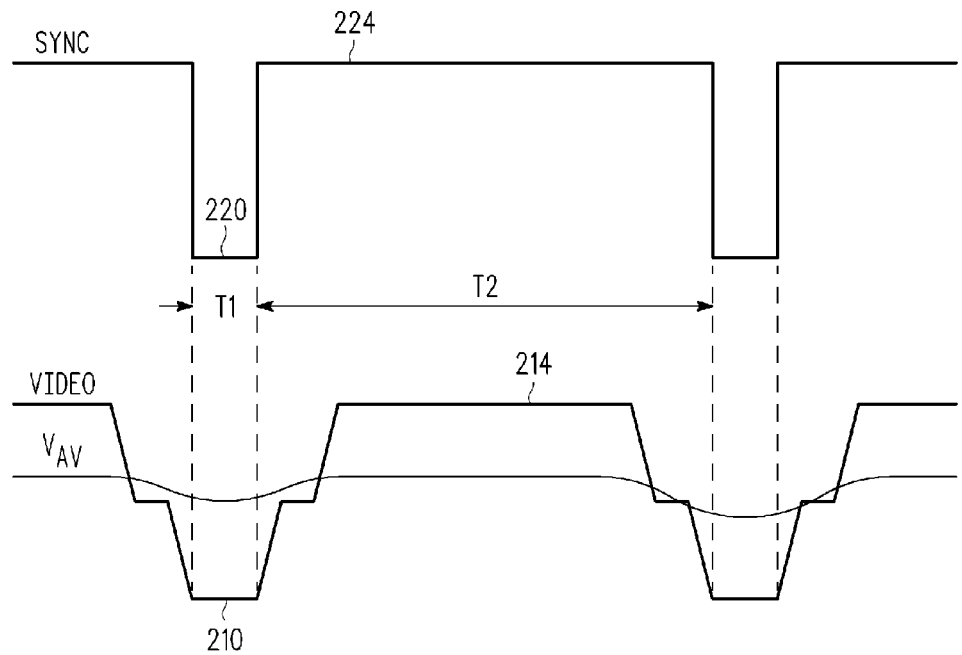
FIG. 2 is a wave form diagram of a particular embodiment of the input and output signals of the synchronization detection module of FIG. 1.

The operation of the synchronization detection module 104 may be better understood with reference to FIG. 2. FIG. 2 illustrates a diagram of a particular embodiment of the VIDEO and SYNC signals of FIG. 1, as well as the change in the voltage $V_{AV}$ over time. The VIDEO signal includes active video portions, such as active video portion 214, and synchronization indicators, including synchronization pulse 210. The VIDEO signal can also include additional video or other information, such as chroma information, that is filtered by the filter 102 and the filter 180. Accordingly, the active video portion 214 can be lumped information or other active video information.

As illustrated, the synchronization pulse 210 is received during an interval T1. During this interval, the voltage at the second electrode of capacitor 120 drops due to the synchronization pulse 210, causing a corresponding increase in the base-emitter voltage at the transistor 130 that is greater than the transistor activation threshold voltage, which places the transistor 130 in saturation mode. Accordingly, the magnitude of the SYNC signal drops from at or near the level of VDD (the level 224) to the voltage level 220. The voltage level 220 is primarily a function of the characteristics of the transistor 130 and the resistive element 162. As a result of the transistor 130 being activated, during interval T1, charge stored by the capacitor 140 is discharged, amplified by the transistor 130 and stored at the capacitor 120 thereby increasing its voltage.

During the interval T2, when the VIDEO signal provides active video information 214, the voltage at the second electrode of capacitor 120 increases due to the higher VIDEO signal voltage, resulting in a corresponding decrease in the base-emitter voltage at the transistor 130 to place the transistor 130 in cutoff mode. Accordingly, the magnitude of the SYNC signal rises from the level 220 to the voltage level 224. Further, during the interval T2 the capacitor 140 is charged through the resistive element 152 at a relatively slow rate as compared to its discharge rate during interval T1, while the voltage at the capacitor 120 is slowly discharged via the resistive element 160. The values of capacitor 140 and resistive elements 150 and 152 are selected so that the ratio of the magnitude of the slow charge current while the transistor is at cutoff to the magnitude of the fast discharge current during saturation is similar to the ratio of T1 to T2. The value of capacitor 120 is selected to be large enough to minimize phase shifts and to have a relatively linear behavior.

The voltage $V_{AV}$ is based on a shifted moving average of the video signal, and represents the pulse detection threshold for the synchronization detection module 104. Accordingly, during the interval T2 the voltage $V_{AV}$ is increased above a threshold such that, when a synchronization pulse is received in the signal VIDEO, a pulse is asserted in the SYNC signal. It will be appreciated that Vav is a self-adjusting threshold voltage that settles at a level which will only allow activation of the transistor by the lowest periodic voltages in the VIDEO signal (i.e. the synch pulses).

The voltage $V_{AV}$ depends primarily on the values of the resistive elements 150, 152, and 160, and the capacitive value of capacitor 140, as well as the voltage of the VIDEO signal, and to a lesser extent depends on the characteristics of transistor 130 and the resistive element 162, as well as other components in the circuit. Accordingly, the pulse detection threshold of the synchronization module 104 is determined based on these values. In a particular embodiment, these values are chosen so that the relatively low voltage of the synchronization pulse compared to the active video portion will be detected as a synchronization pulse, while variations in the active video portion will not trigger a pulse detection. In addition, the values are selected so that the synchronization detection module 104 has a high gain, and the transistor 130 is only in an active region for a relatively brief period of time as the transistor 130 transitions between the cut-off and saturation states.

In a particular embodiment, the capacitor 120 has a capacitive value of 1 microFarad, the capacitor 140 has a capacitive value of 68 nanoFarads, the resistive elements 150 and 152 each have a resistive value of one megaohm, the resistive element 160 has a resistive value of 4.7 kilo-ohms, and the resistive element 162 has a resistive value of 8.2 kilo-ohms.

Figure 3:
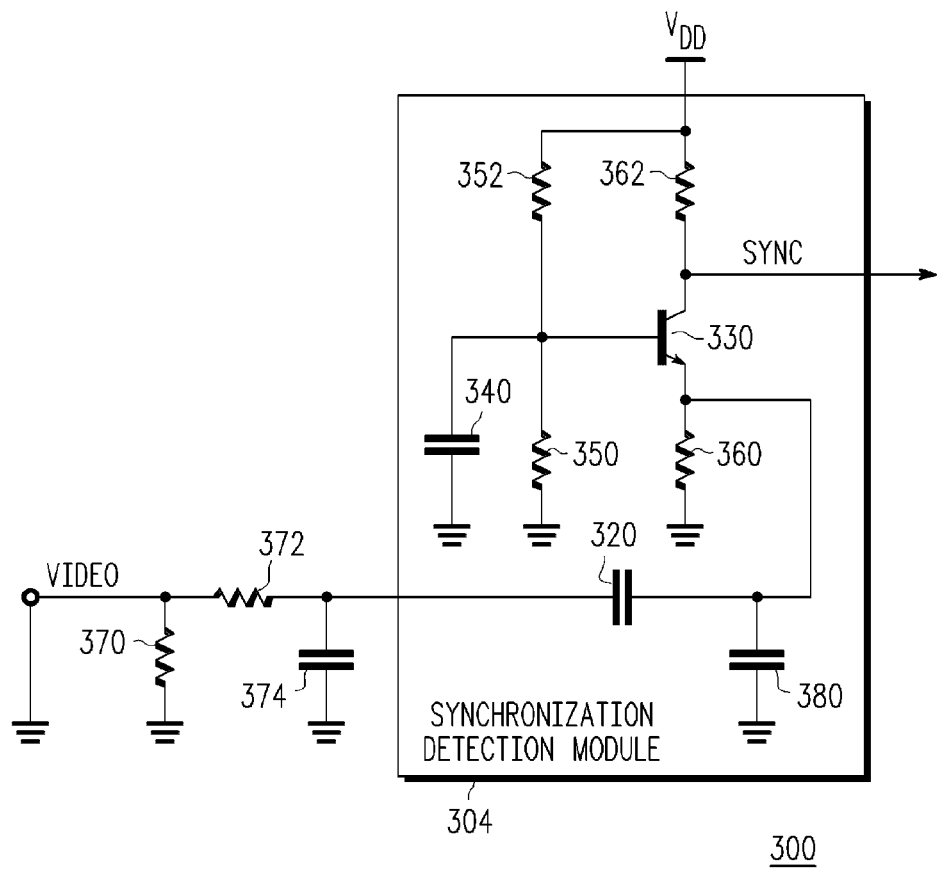
FIG. 3 is a circuit diagram of a particular embodiment of the synchronization detection module of FIG. 1.

Referring to FIG. 3, a particular embodiment of a device 300 having a synchronization detection module 304, corresponding to the synchronization detection module 104 of FIG. 1, is illustrated. The device includes resistors 370 and 372, capacitor 374, and the synchronization detection module 304. The resistor 370 includes a first electrode to receive the VIDEO signal and a second electrode connected to the ground voltage reference. The resistor 372 includes a first electrode connected to the first electrode of the resistor 370 and a second electrode. The capacitor 374 includes a first electrode connected to the second electrode of the resistor 372 and a second electrode connected to the ground voltage reference. The capacitor 320 includes a first electrode connected to the second current electrode of the resistor 372 and a second electrode connected to the second current electrode of the transistor 330. The capacitor 380 includes a first electrode connected to the second electrode of the capacitor 320 and a second electrode connected to the ground voltage reference.

The synchronization detection module 304 includes an N-channel bipolar transistor 330, resistors 350, 352, 360, and 362, and capacitors 320, 340, and 380. The transistor 330 includes a first collector) current electrode to provide the signal SYNC, a second (emitter) current electrode, and a control (base) electrode. The resistor 362 includes a first electrode connected to a voltage reference VDD and a second electrode connected to the first current electrode of the transistor 330. The resistor 352 includes a first electrode connected to the voltage reference VDD and a second electrode connected to the control electrode of the transistor 330. The resistor 350 includes a first electrode connected to the control electrode of the transistor 330 and a second electrode connected to a ground voltage reference. The resistor 360 includes a first electrode connected to the second current electrode of the transistor 330 and a second electrode connected to the ground voltage reference. The capacitor 340 includes a first electrode connected to the control electrode of the transistor 330 and a second electrode connected to the ground voltage reference. The capacitor 320 includes a first electrode connected to the second current electrode of the resistor 372 and a second electrode connected to the second current electrode of the transistor 330. The capacitor 380 includes a first electrode connected to the second electrode of the capacitor 320 and a second electrode connected to the ground voltage reference.

During operation, the arrangement of the resistors 370, 372, and the capacitors 374 and 380 perform a filtering operation on the VIDEO signal to filter chroma information from the signal. Accordingly, these elements correspond to the filters 102 and 180 of FIG. 1. The remaining elements are arranged in the same fashion as the elements of the synchronization detection module 104 of FIG. 1, and operate as discussed with respect to that figure.

Figure 4:
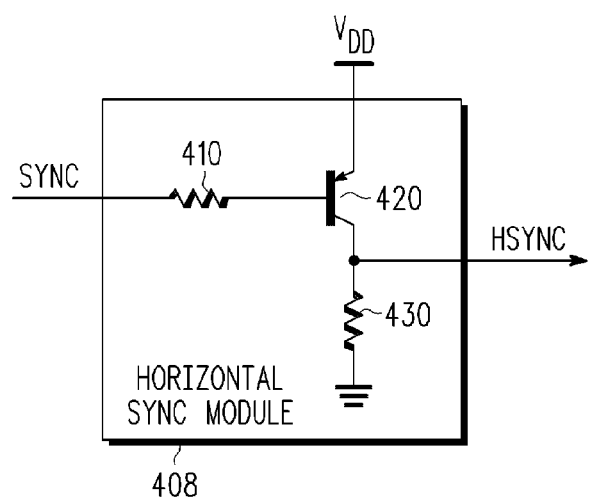
FIG. 4 is a circuit diagram of a particular embodiment of the horizontal sync module of FIG. 1.

Referring to FIG. 4, a block diagram of a particular embodiment of a horizontal sync module 408, corresponding to the horizontal sync module 108 of FIG. 1, is illustrated. The horizontal sync module 408 includes a P-channel bipolar transistor 420 and resistors 410 and 430. The transistor 420 includes a first (emitter) current electrode connected to the voltage reference VDD, a second (collector) current electrode to provide the signal HSYNC, and a control (base) electrode. The resistor 410 includes a first electrode to receive the signal SYNC and a second electrode connected to the control electrode of the transistor 420. The resistor 430 includes a first electrode connected to the second current electrode of the transistor 430 and a second electrode connected to the ground voltage reference.

During operation the horizontal sync module 408 inverts the SYNC signal to provide a logical representation of the signal HSYNC. Accordingly, when the SYNC signal is at a low level, indicating the presence of a synchronization pulse, the transistor 420 is activated and the HSYNC signal is placed at the approximate level of the voltage reference VDD. When the SYNC signal is at a high level, indicating no synchronization pulse, the transistor 420 is not activated and the HSYNC signal is placed at the approximate level of the ground voltage reference.

Figure 5:
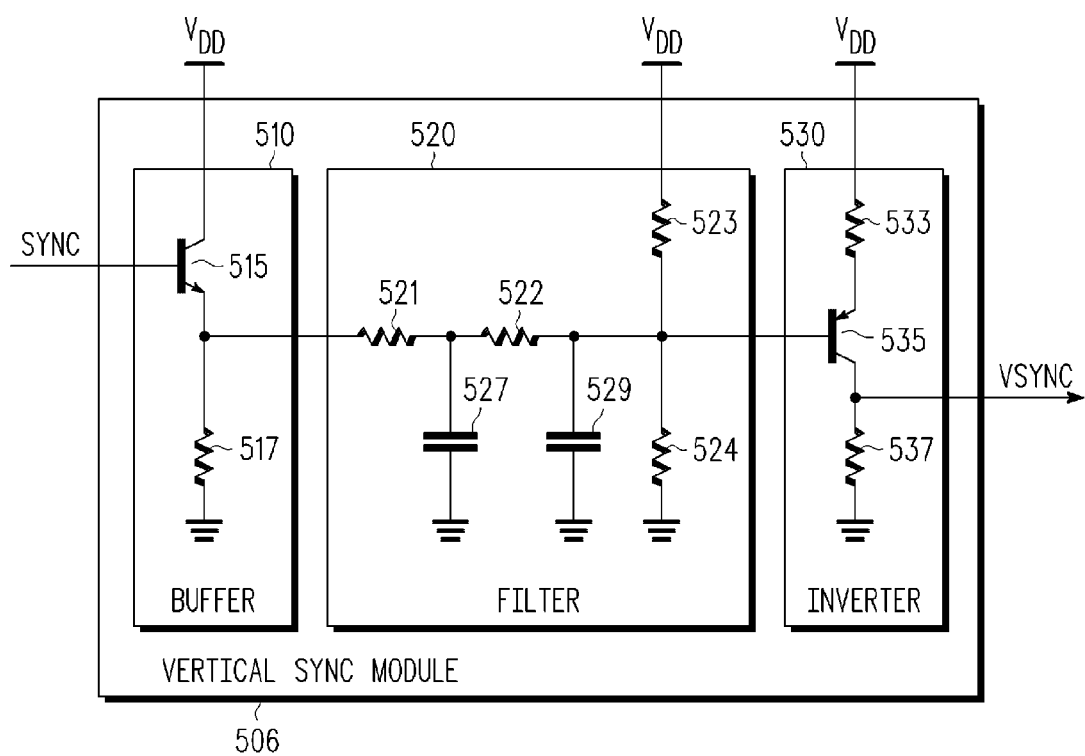
FIG. 5 is a circuit diagram of a particular embodiment of the vertical sync module of FIG. 1.

Referring to FIG. 5, a circuit diagram of a particular embodiment of a vertical synchronization module 506, corresponding to the vertical synchronization module 106 of FIG. 1, is illustrated. The vertical synchronization module 506 includes a buffer 510, a filter 520, and an inverter 530. The buffer 510 includes an N-channel bipolar transistor 515 and a resistor 517. The transistor 515 includes a first current (collector) electrode connected to the voltage reference VDD, a second current (emitter) electrode, and a control (base) electrode to receive the signal SYNC. The resistor 517 includes a first electrode connected to the second current electrode of the transistor 515 and a second electrode connected to the ground reference voltage.

The filter 520 includes resistors 521, 522, 523, and 524 and capacitors 527 and 529. The resistor 521 includes a first electrode connected to the second current electrode of the transistor 515 and a second electrode. The resistor 522 includes a first electrode connected to the second electrode of the resistor 521 and a second electrode. The resistor 523 includes a first electrode connected to the voltage reference VDD and a second electrode connected to the second electrode of the resistor 522. The resistor 524 includes a first electrode connected to the second electrode of the resistor 522 and a second electrode connected to the ground voltage reference.

The capacitor 527 includes a first electrode connected to the second electrode of the resistor 521 and a second electrode connected to the ground voltage reference. The capacitor 529 includes a first electrode connected to the second electrode of the resistor 522 and a second electrode connected to the ground voltage reference.

The inverter 530 includes a P-channel transistor 535 and resistors 533 and 537. The transistor 535 includes a first current (emitter) electrode, a second current (collector) electrode to provide the signal VSYNC, and a control (base) electrode connected to the second electrode of the resistor 522. The resistor 533 includes an electrode connected to the voltage reference VDD and an electrode connected to the first current electrode of the transistor 535. The resistor 537 includes an electrode connected to the second current electrode of the transistor 535 and an electrode connected to the ground voltage reference.

During operation the vertical sync module 506 receives synchronization pulses via the signal SYNC. The buffer 510 buffers these pulses, so that the output of the synchronization detection module 104 is not overloaded and to provide isolation. The filter 520 filters the received sync pulses so that only those synch pulses that occur below a threshold frequency will generate a vertical sync pulse. Since the filter 520 attenuates the high frequency SYNC pulses, only the low frequency SYNC pulses corresponding to the vertical synch will be presented at the control (base) electrode of transistor 535. This prevents the vertical sync module 506 from producing a vertical sync pulse every time a horizontal sync pulse is received from the synchronization detection module 104. In a particular embodiment, the filter 520 is a second order 60 Hertz low-pass filter. The resulting filtered signal includes the vertical synchronization pulses. The filtered signal is provided to the inverter 530 to invert and amplify the signal. The inverted vertical synchronization signal is provided as the signal VSYNC.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present disclosure is not intended to be limited to the specific form set forth herein, but on the contrary, it is intended to cover such alternatives, modifications, and equivalents, as can be reasonably included within the scope of the disclosure. For example, although for purposes of discussion the embodiment disclosed herein have referred to providing a synchronization indication in response to a relatively lower magnitude of a video signal, as compared to the active video portion of the signal, it will be appreciated that similar embodiments can be implemented to provide synchronization indicators in response to a relatively higher magnitude of the video signal as compared to the magnitudes of the active video portion. Further, although the embodiments disclosed herein have referred to certain transistors as having a particular polarity, it will be appreciated that transistors of other polarities may also be employed. It will further be appreciated that, although some circuit elements are depicted as connected to other circuit elements, the illustrated elements may also be coupled via additional circuit elements, such as resistors, capacitors, transistors, and the like.

What is claimed is:

1. A device, comprising
   an input node configured to receive a composite video signal that provides active video information during a first interval and synchronization information during a second interval;
   a first capacitor comprising a first electrode coupled to the input node and a second electrode;
   a first transistor comprising a first current electrode coupled to a first voltage reference, a second current electrode coupled to the second electrode of the first capacitor, and a control electrode;
   a second capacitor comprising a first electrode coupled to the control electrode of the first transistor and a second electrode, the second capacitor having a capacitive value;
   a first resistive element comprising a first electrode coupled to the first voltage reference and a second electrode coupled to the control electrode of the first transistor, the first resistive element having a first resistive value; and
   a second resistive element comprising a first electrode coupled to the control electrode of the first transistor and a second electrode coupled to a second voltage reference, the second resistive element having a second resistive value, the capacitive value, first resistive value, and second resistive value such that the first transistor is placed in cutoff mode during the first interval and in a saturation mode during the second interval.

2. The device of claim 1, further comprising a horizontal synchronization module comprising an input coupled to the first current electrode of the first transistor and an output configured to provide a horizontal synchronization signal based on the composite video signal.

3. The device of claim 2, wherein the horizontal synchronization module comprises a second transistor comprising a first current electrode coupled to the first voltage reference, a second current electrode coupled to the second voltage reference, and a control electrode coupled to the first current electrode of the first transistor.

4. The device of claim 1, further comprising:
a vertical synchronization module comprising an input coupled to the first current electrode of the first transistor and an output configured to provide a vertical synchronization signal based on the composite video signal.

5. The device of claim 4, wherein the vertical synchronization module comprises:
a buffer comprising an input coupled to the first current electrode of the first transistor and an output;
a filter comprising an input coupled to the output of the buffer and an output; and
an inverter comprising an input coupled to the output of the filter and an output configured to provide the vertical synchronization signal.

6. The device of claim 5, wherein the buffer comprises a second transistor comprising a first current electrode coupled to the first voltage reference, a second current electrode coupled to the second voltage reference, and a control electrode coupled to the first current electrode of the first transistor.

7. The device of claim 5 wherein the filter comprises:
a third capacitor comprising a first electrode coupled to the output of the buffer and a second electrode coupled to the second voltage reference;
a third resistive element comprising a first electrode coupled to the first electrode of the third capacitor and a second electrode; and
a fourth capacitor comprising a first electrode coupled to the second electrode of the third resistive element and a second electrode coupled to the second voltage reference.

8. The device of claim 1, wherein a charge stored by the second capacitor represents an average voltage level of the composite video signal.

9. The device of claim 1, further comprising:
a filter coupled between the input node and the first electrode of the first capacitor.

10. The device of claim 1, further comprising:
a third resistive element coupled between the first voltage reference and the first current electrode of the first transistor.

11. The device of claim 1, further comprising:
a third resistive element coupled between the second current electrode of the first transistor and the second voltage reference.

12. The device of claim 11, wherein the third resistive element is a resistor.

13. The device of claim 11, wherein the third resistive element is an inductor.

14. The device of claim 1, wherein the second electrode of the second capacitor is coupled to the second voltage reference.

15. A method, comprising:
receiving a video signal at an input;
during a first interval, maintaining a base-emitter voltage between a control node of a transistor and a current electrode of the transistor at a first state relative to a threshold in response to the composite video signal providing active video information;
during a second interval, changing the base-emitter voltage between the control node of a transistor and the current electrode of the transistor to a second state relative to the threshold in response to the video signal providing synchronization information; and
providing a first representation of a synchronization signal during the second interval.

16. The method of claim 15, further comprising providing a horizontal synchronization signal based on the first representation of a synchronization signal.

17. The method of claim 15, wherein the first interval corresponds to a cut-off state of the transistor.

18. The method of claim 17, wherein the second interval corresponds to a saturation state of the transistor.

19. The method of claim 15, wherein the threshold level is based on a detected moving average of the video signal.

20. The method of claim 15, wherein the video signal is a composite video signal.

* * * * *